(12) United States Patent
Janik et al.

(10) Patent No.: US 12,550,239 B2
(45) Date of Patent: Feb. 10, 2026

(54) MODULAR FERRORESONANT LED DRIVER

(71) Applicant: SIGNIFY HOLDING B.V., Eindhoven (NL)

(72) Inventors: Raymond George Janik, Fayetteville, GA (US); Russell Scott Trask, Sharpsburg, GA (US); Khurram Zeshan Moghal, Senoia, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/724,772

(22) PCT Filed: Dec. 13, 2022

(86) PCT No.: PCT/EP2022/085559
§ 371 (c)(1),
(2) Date: Jun. 27, 2024

(87) PCT Pub. No.: WO2023/131479
PCT Pub. Date: Jul. 13, 2023

(65) Prior Publication Data
US 2025/0071871 A1 Feb. 27, 2025

Related U.S. Application Data

(60) Provisional application No. 63/296,941, filed on Jan. 6, 2022.

(30) Foreign Application Priority Data

Jan. 18, 2022 (EP) ..................................... 22152026

(51) Int. Cl.
H05B 45/37 (2020.01)
H02M 1/00 (2006.01)
H02M 5/10 (2006.01)

(52) U.S. Cl.
CPC ............ *H05B 45/37* (2020.01); *H02M 1/007* (2021.05); *H02M 5/10* (2013.01)

(58) Field of Classification Search
CPC ........ H05B 45/37; H02M 1/007; H02M 5/10; H02M 7/06
See application file for complete search history.

(56) References Cited

U.S. PATENT DOCUMENTS

3,250,953 A  5/1966 Everest
6,560,128 B1  5/2003 Rajda et al.
(Continued)

Primary Examiner — Minh Tran (57) ABSTRACT

A lighting device, including a first and a second ferroresonant transformer, is provided. Each ferroresonant transformer includes an input winding, an energy storage winding, and an output winding. Each input winding is configured to receive the same AC power. The input windings are arranged on the primary sides of the ferroresonant transformers. The energy storage windings and the output windings are arranged on the secondary side of the ferroresonant transformers. Each energy storage winding is electrically coupled to the same group of capacitors. The output windings are configured to provide output power signals based on the capacitors and the AC power. The output power signals have constant current and constant voltage. The output power signals are rectified, smoothed, and provided to one or more LEDs. Additional ferroresonant transformers may be added to the lighting device to accommodate requirements for increased power levels.

11 Claims, 5 Drawing Sheets

(56) References Cited

U.S. PATENT DOCUMENTS

| | | | |
|---|---|---|---|
| 6,570,345 B1* | 5/2003 | Munson | H05B 39/044 |
| | | | 315/297 |
| 10,064,248 B2 | 8/2018 | Janik et al. | |
| 2012/0181941 A1* | 7/2012 | Kimura | H05B 45/385 |
| | | | 315/200 R |
| 2013/0147379 A1* | 6/2013 | Zhou | H05B 45/24 |
| | | | 315/210 |
| 2017/0265259 A1* | 9/2017 | Janik | H05B 45/37 |
| 2019/0363573 A1 | 11/2019 | Le et al. | |

* cited by examiner

MODULAR FERRORESONANT LED DRIVER

CROSS-REFERENCE TO PRIOR APPLICATIONS

This application is the U.S. National Phase application under 35 U.S.C. § 371 of International Application No. PCT/EP2022/085559, filed on Dec. 13, 2022, which claims the benefit of European Patent Application No. 22152026.5, filed on Jan. 18, 2022, and U.S. Provisional Application No. 63/296,941, filed Jan. 6, 2022. These applications are hereby incorporated by reference herein.

FIELD OF THE DISCLOSURE

The present disclosure is directed generally to driver circuits for light emitting diodes utilizing ferroresonant transformers.

BACKGROUND

Outdoor lighting devices (such as street lights) are prone to early failure due to transient line surges. In some cases, ferroresonant transformers are implemented to protect the devices against such surges. Ferroresonant transformers, also known as constant voltage transformers, can be configured to provide the lighting device with a constant voltage and a constant current. However, existing ferroresonant transformer designs must be customized according to electrical parameters regarding load power, voltage, and current, as well as mechanical parameters regarding size and mass. Customizing the ferroresonant transformer will require machining custom cores, windings, and magnetic shunts suitable for the design requirements. Requiring a newly designed, customized ferroresonant transformer conforming to variations of each of the aforementioned parameters results in significant material and manufacturing costs. Accordingly, there is a need in the art for a ferroresonant transformer configuration capable of operating at a wide array of load powers, voltages, and currents.

SUMMARY OF THE DISCLOSURE

The present disclosure is directed to a modular ferroresonant driver for light emitting diodes (LEDs). The driver includes a plurality of ferroresonant transformers electrically coupled to a common group of one or more capacitors, referred to as an energy tank. The ferroresonant transformers are modular and standardized, such that ferroresonant transformers may be added to or removed from the overall design as needed, without requiring design and manufacturing of a new ferroresonant transformer for each application. The modular ferroresonant driver provides a power signal of constant current and constant power to one or more LEDs.

Generally, in one aspect, a lighting device is provided. The lighting device includes a first ferroresonant transformer. The first ferroresonant transformer includes a first input winding. The first input winding is configured to receive alternating current (AC) power. The first input winding is arranged on a primary side of the first ferroresonant transformer. According to an example, the AC power has a voltage of at least 300 VAC.

The first ferroresonant transformer further includes a first energy storage winding. The first energy storage winding is electrically coupled to one or more capacitors. The first energy storage winding is arranged on a secondary side of the first ferroresonant transformer. According to an example, at least two of the one or more capacitors are arranged in parallel.

The first ferroresonant transformer further includes a first output winding. The first output winding is configured to provide a first output power signal based on the one or more capacitors and the AC power. The first output winding is arranged on a secondary side of the first ferroresonant transformer. According to an example, the first output power signal has a voltage of at least 60 V.

The lighting device further includes a second ferroresonant transformer. The second ferroresonant transformer includes a second input winding. The second input winding is configured to receive the AC power. The second input winding is arranged on a primary side of the second ferroresonant transformer.

The second ferroresonant transformer further includes a second energy storage winding. The second energy storage winding is electrically coupled to the one or more capacitors. The second energy storage winding is arranged on a secondary side of the second ferroresonant transformer.

The second ferroresonant transformer further includes a second output winding. The second output winding is configured to provide a second output power signal. The second output power signal is based on the one or more capacitors and the AC power. The second output winding is arranged on a secondary side of the second ferroresonant transformer. According to an example, the first output winding is electrically coupled to the second output winding. The first ferroresonant transformer and the second ferroresonant transformer may be arranged in parallel. Alternatively, the first ferroresonant transformer and the second ferroresonant transformer may be arranged in series. According to another example, the first output power signal and the second output power signal are substantially equal.

The lighting device further includes a rectifier circuit. The rectifier circuit is electrically coupled to the first output winding. The rectifier circuit is configured to generate a first rectified power signal based on the first output power signal.

The lighting device further includes a smoothing capacitor. The smoothing capacitor is electrically coupled to the rectifier circuit. The smoothing capacitor is configured to generate a first smoothed power signal based on the first rectified power signal and a first load inductance. The first load inductance corresponds to a gap between the first energy storage winding and a first output winding.

The lighting device further includes a first LED. The first LED is electrically coupled to the first output winding. The lighting device further includes a second LED. The second LED is electrically coupled to the second output winding. The first LED and the second LED are electrically coupled. In one example, the first LED and the second LED may be arranged in series. Alternatively, the first LED and the second LED may be arranged in parallel.

The lighting device further includes a plurality of input taps. The plurality of input taps are electrically coupled to the first input winding. The lighting device further includes a plurality of output taps. The plurality of output taps are electrically coupled to the first output winding.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Ferroresonant drivers are generally transformer-based power supplies that use nonlinear magnetic properties and a resonant circuit to provide a stable output voltage over a wide range of input voltage. Example ferroresonant drivers are shown in U.S. Pat. No. 10,064,248.

The present disclosure is directed to a modular ferroresonant driver for light emitting diodes (LEDs). The driver includes a plurality of ferroresonant transformers electrically coupled to a common array of one or more capacitors, referred to as an energy tank. The ferroresonant transformers are modular and standardized, such that ferroresonant transformers may be added to or removed from the overall design as needed, without requiring a design of a new ferroresonant transformer for each application. The modular ferroresonant driver provides a power signal of constant current and constant power to one or more LEDs.

Each ferroresonant transformer includes a primary side with an input winding and a secondary side with an energy storage winding and an output winding. Each of the windings is wrapped around a core. The input winding of each ferroresonant transformer receives an alternating current (AC) power signal. The primary side and secondary side of the ferroresonant transformer are separated by magnetic shunts. The magnetic shunts result in a primary leakage inductance between the primary and secondary windings. The secondary windings (the energy storage winding and the output winding) are separated by an air gap. The gap results in a secondary leakage inductance between the energy storage winding and the output winding. The common capacitors resonate with the primary leakage inductance, resulting in energy storage, core saturation, and the development of constant current and constant voltage in the output winding.

The output of the ferroresonant transformer modules may be arranged in parallel, series, or any appropriate combination. In one example, two ferroresonant transformer outputs are arranged in parallel such that the output current is the sum of the individual output currents of each ferroresonant transformer. The output power signal is then provided to a bridge rectifier to convert the output from the ferroresonant transformers from AC to direct current (DC). The signal generated by the rectifier is then smoothed by a smoothing capacitor. The smoothing capacitor performs the smoothing by forming a low pass filter with the secondary leakage inductance on the output winding(s). The smoothed signal is then provided to one or more LEDs.

In one example, each ferroresonant transformer is optimized for 200 W to 400 W of output power. For example, the optimum output power for a specific lamination, ideal stack height, maximum window fill, lowest losses, and lowest cost may be 300 W. This optimization may be based on the designs of the core, the windings, the magnetic shunts, and the accompanying discrete components (LEDs, capacitors, etc.) Therefore, to power an LED circuit requiring 900 W, the modular ferroresonant LED driver may include three ferroresonant transformers, each designed to handle 300 W. Accordingly, this modular configuration eliminates the need for expensive and time-consuming custom design and machining of a ferroresonant transformer for each unique application.

Further, the modular configuration allows for creative arrangement of each modular ferroresonant transformer within a lighting device. For example, while one 900 W ferroresonant transformer may be too heavy to arrange in a lighting device, three 300 W ferroresonant transformers may be dispersed throughout the lighting device for improved mass-balancing.

Common use of the energy tank by each ferroresonant transformer results in a flywheel effect, where the voltage provided by each transformer is stored in the energy tank, regardless of magnitude or phase. When the capacitors of the energy tank release their stored energy, the voltages provided to the output windings of each ferroresonant transformer are synchronized.

An additional advantage of the modular ferroresonant LED driver is the robustness of its components. LED drivers and power supplies often contain fragile components sensitive to power surges. However, the primary components of the modular ferroresonant LED drivers, such as the windings and the core, are robust copper and steel.

Figure 1:
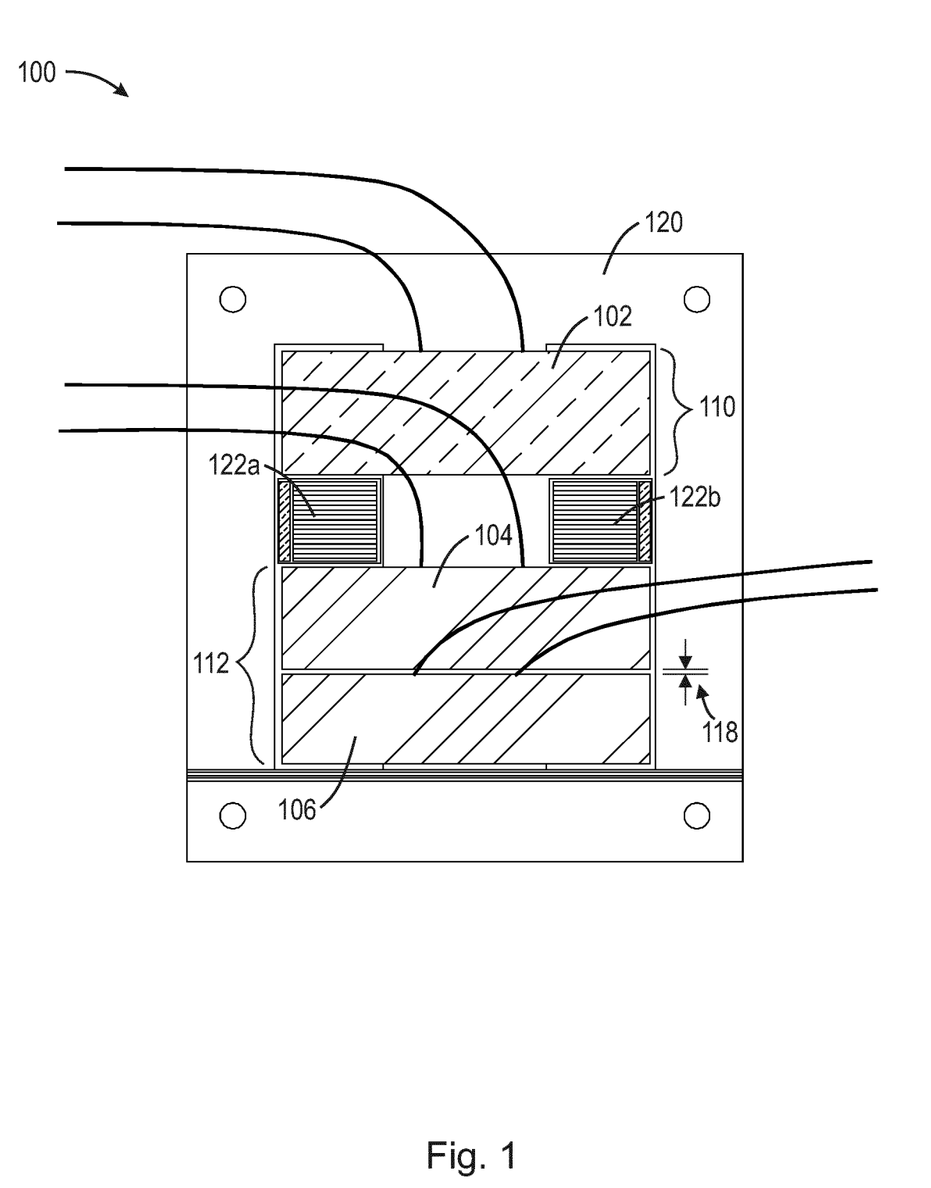
FIG. 1 is an illustration of a modular ferroresonant transformer, in accordance with an example.

FIG. 1 illustrates the physical structure of an example ferroresonant transformer 100. The ferroresonant transformer 100 includes a first input winding 102 arranged on the primary side 110 of the transformer 100. The ferroresonant transformer 100 also includes two windings arranged on the secondary side 112 of the transformer 100; a first energy storage winding 104 and a first output winding 106. In a typical arrangement, the first input winding 104 is electrically coupled to a power source, such as an AC source, while the first output winding 106 is electrically coupled to circuitry configured to power one or more LEDs. The first energy storage winding 104 is typically connected to one or more capacitors. As will be explained in further detail below, these capacitors may be connected to multiple ferroresonant transformers, thus enabling the modular aspect of the present invention.

The ferroresonant transformer 100 further includes a core 120. In one example, the core 120 may be steel. Each of the aforementioned windings 102, 104, 106 are wrapped around the core 120. The first output winding 106 is separated from the first energy storage winding 104 by a gap 118. This gap 118 results in a secondary leakage inductance, $L_{load}$, between the first energy storage winding 104 and the first output winding 106. The ferroresonant transformer 100 further includes magnetic shunts 122a, 122b. The magnetic shunts 122a, 122b may be made of the same (or similar) material as the core 120. The magnetic shunts 122a, 122b form a primary leakage path, $L_{leakage}$, between the primary side 110 and the secondary side 112 of the transformer 100, enabling the magnetic flux on the primary side 110 to be different than the magnetic flux on the secondary side 112.

In operation, the first input winding 102 receives AC power 12 (not shown). The voltage on the first energy storage winding 104 and the first output winding 106 increases as the voltage on the first input winding 102 increases until a portion of the core at the secondary side 112 reaches saturation. Upon saturation, the capacitors 14 (not shown) coupled to the first energy storage winding 104 resonate due to $L_{leakage}$, providing energy to the first output winding 104 sufficient to maintain an output signal of constant current. In some examples, the constant output signal resembles a square wave in terms of waveform shape. As will be described below, this output voltage signal is subsequently provided to additional processing circuitry (such as a rectifier, a smoothing capacitor, etc.) to power one or more LEDs.

Figure 2:
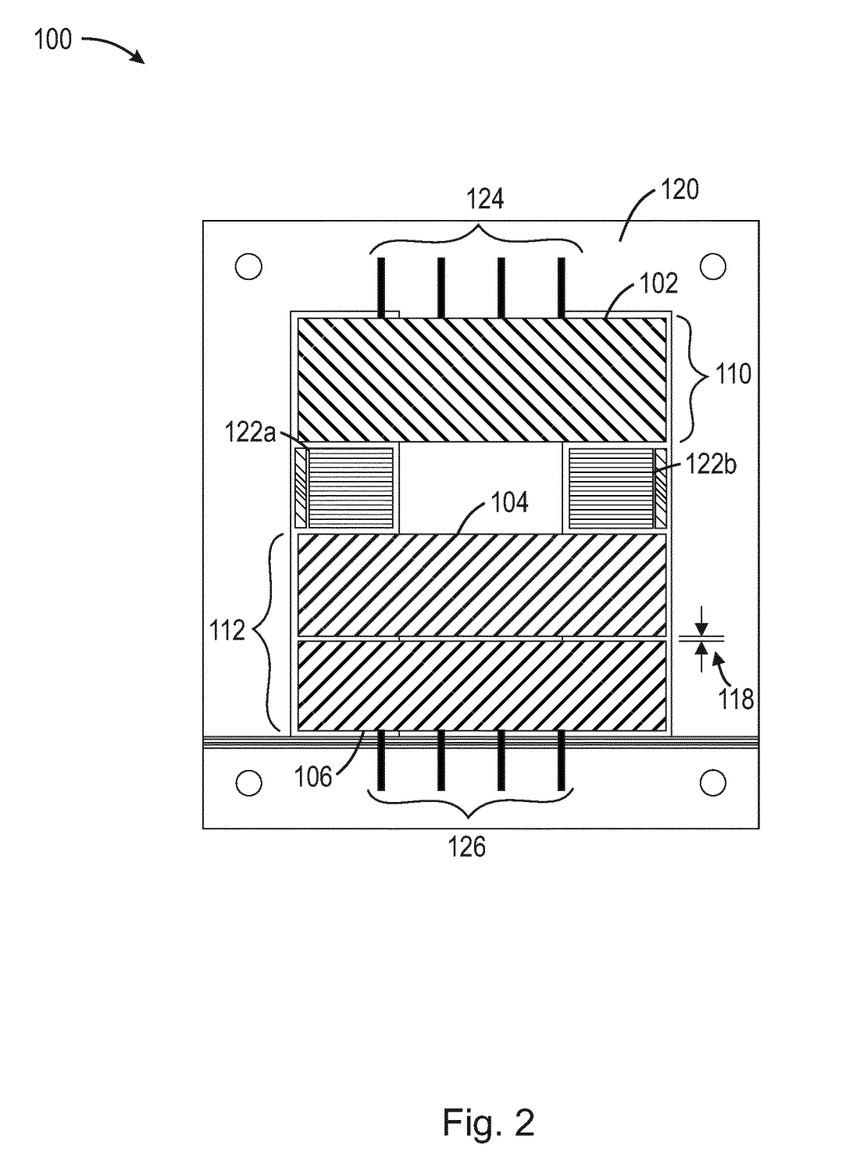
FIG. 2 is an illustration of a modular ferroresonant transformer, in accordance with a further example.

FIG. 2 illustrates a further example of a ferroresonant transformer 100. In this example, the ferroresonant transformer 100 includes a plurality of input taps 124 and a plurality of output taps 126. The AC power source may connect to one of the input taps 124, while the aforementioned additional processing circuitry may connect to one of the output taps 126. The turn ratio of the primary side 110 and the secondary side 112 of the ferroresonant transformer 100 depends on the selection of input taps 124 and output taps 126. Accordingly, varying combinations of input taps 124 and output taps 126 may be used to adjust the voltage level of the output power signal generated by the ferroresonant transformer 100.

Figure 3:
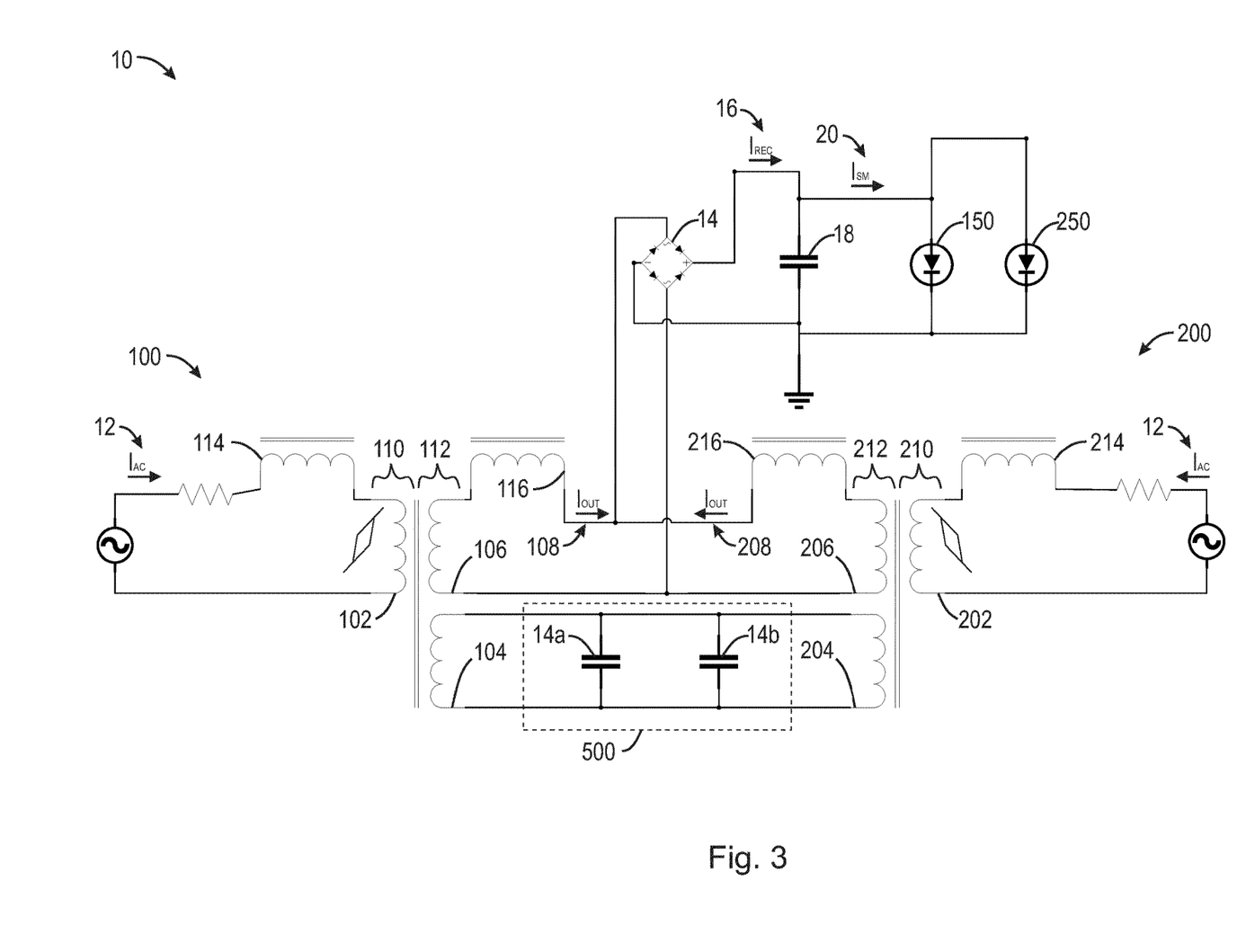
FIG. 3 is a schematic of a lighting device including two modular ferroresonant transformers, in accordance with an example.

FIG. 3 is a schematic of a lighting device 10 including two modular ferroresonant transformers 100, 200. The first ferroresonant transformer 100 has a primary side 110 including a first input winding 102 with a first primary leakage inductance 114 ($L_{leakage}$) due to the magnetic shunts 122a, 122b shown in FIG. 1. The primary side 110 receives AC power 12, $I_{AC}$, from an AC current source. In one example, the AC power 12 has a voltage of at least 300 VAC. The secondary side 112 of the ferroresonant transformer 100 includes a first output winding 106 and a first energy storage winding 104. The first energy storage winding 104 is electrically coupled to one or more capacitors 14a, 14b. The one or more capacitors 14a, 14b may be collectively referred to as an energy tank 500. The one or more capacitors 14a, 14b may be arranged in serial, parallel, or any combination thereof. The capacitors 14a, 14b of the energy tank 500 resonate with the first leakage inductance 114. This resonance leads to a first output power signal 108, represented as $I_{OUT}$ on FIG. 2, on the first output winding 106 having a constant voltage and a constant current.

The first output winding 106 is coupled to a rectifier 14. The rectifier 14 generates a rectified power signal 16, represented as $I_R c$ in FIG. 2. As shown in FIG. 2, the rectifier 14 can be a bridge rectifier. The rectifier 14 is required to provide positive voltage signals to the LEDS 150, 250.

The rectified power signal 16 is received by smoothing capacitor 18. The smoothing capacitor is configured to remove ripple from the rectified power signal 16 by forming a low pass filter with the first load inductance 116 of the first output winding 106. The smoothed power signal 20 ($I_{SM}$) is then used to power the LEDs 150, 250. The LEDs may be arranged in parallel (as shown in FIG. 2), series, or any combination thereof.

Mismatches in the output voltage across the first output winding 106 and the second output winding 206 may be the result of turn ratio errors in either of the ferroresonant transformers 100, 200. These mismatches can result in circulating currents when the ferroresonant transformers 100, 200 are connected in parallel, as shown in FIG. 3. However, the load inductances 116, 216 introduce a tolerance to effectively eliminate the circulating current.

FIG. 3 also shows a second ferroresonant transformer 200. Like the first ferroresonant transformer 100, the second ferroresonant transformer 200 has a primary side 210 including a first input winding 202 with a first leakage inductance 214. The primary side 210 receives an AC power 12, $I_{AC}$, from the same AC current source as the first ferroresonant transformer 100. The secondary side 212 of the second ferroresonant transformer 200 includes a first output winding 206 and a second energy storage winding 204. The second energy storage winding 204 is electrically coupled to the same capacitors 14a, 14b as the first energy storage winding 104. In some examples, the various properties of the second ferroresonant transformer 200, such as the dimensions of the windings and the core, are identical to the first ferroresonant transformer 100.

The output of the second ferroresonant transformer 200 is connected in parallel to the output of the first ferroresonant transformer 100. Thus, in this example, the current of the second output power signal 208 at the second output winding 206 and the current of the first output power signal 108 will add and provide higher current and power to the LEDs. The first and second load inductances 116, 216 remove any circulating currents due to turn mismatches.

Figure 4:
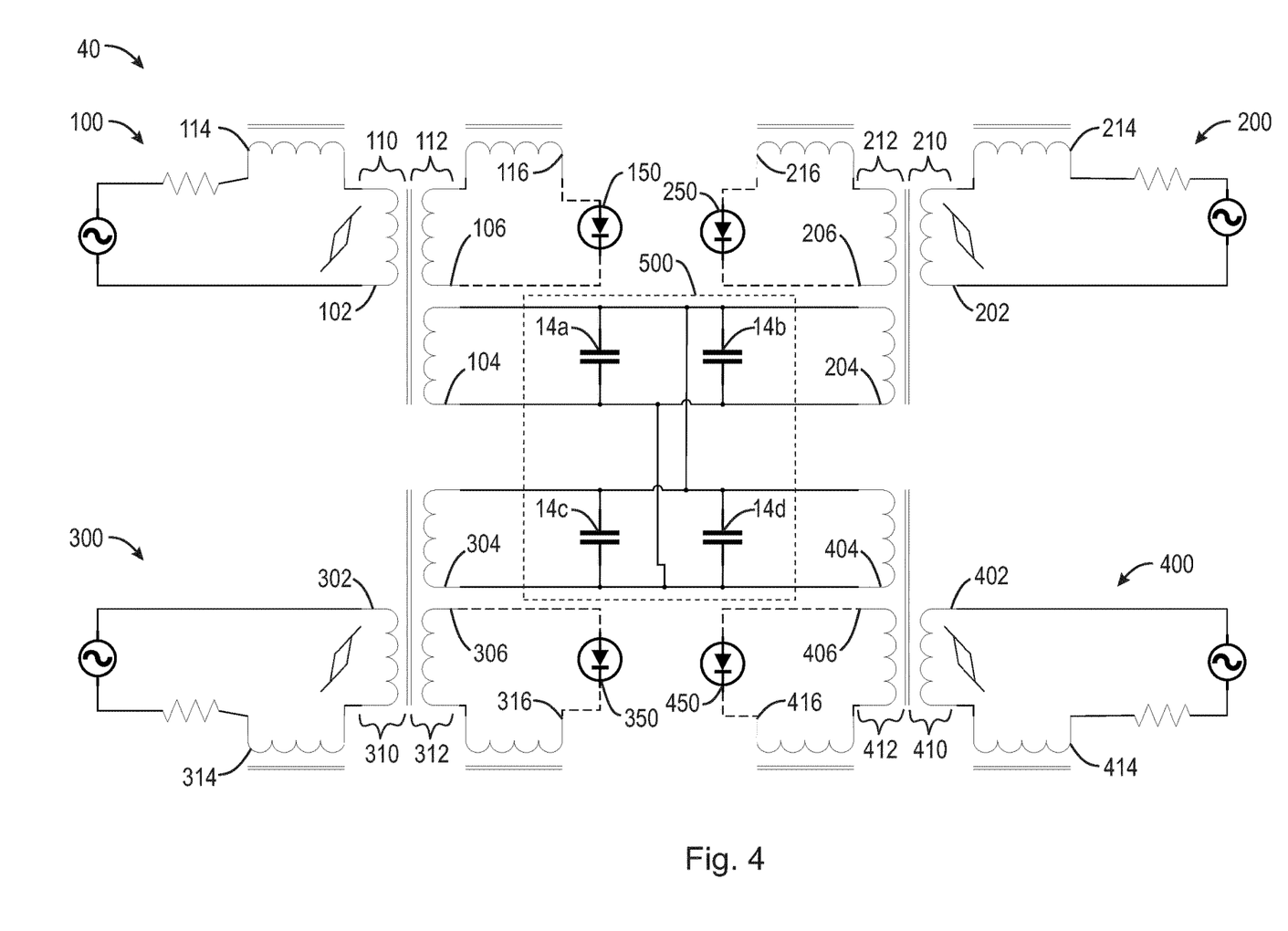
FIG. 4 is a schematic of a lighting device including four modular ferroresonant transformers, in accordance with an example.

FIG. 4 shows a lighting device 40. Lighting device 40 is a variation of the lighting device 10 of FIG. 2. In this variation, four ferroresonant transformers 100, 200, 300, 400 are used. In this case, the LEDs 150, 250, 350, 450 of lighting device 40 of FIG. 3 may require more power than two ferroresonant transformers 100, 200 can safely handle. Accordingly, and as per the modular design of the present invention, two additional ferroresonant transformers 300, 400 may be added to increase the power handling capabilities of the overall lighting device. In this example, the LED load is divided equally among the ferroresonant modules without electrically connecting their respective outputs. In another embodiment, the outputs of the modules may be connected in series in the proper polarity to increase the output voltage while keeping the current equal to that of an individual ferroresonant module. In yet another embodiment, the outputs may be connected in parallel in the proper polarity to increase the current delivered to the LED load while the current remains equal to that of an individual module. In an even further embodiment, the outputs of two pairs of modules may be connected in series, while then connecting the two pairs in parallel, resulting in approximately doubling the output current and output voltage of an individual module. Further, adding input taps and output taps increases the flexibility of matching different LED loads to the combined ferroresonant output.

The third ferroresonant transformer 300 has a primary side 310 including a first input winding 302 with a first leakage inductance 314. The primary side 310 receives an AC power 12, $I_{AC}$, from the same AC current source as the first and second ferroresonant transformers 100, 200. The secondary side 312 of the third ferroresonant transformer 300 includes a third output winding 306 and a third energy storage winding 304. The third energy storage winding 304 is electrically coupled to the same capacitors 14a, 14b, 14c, 14d of the energy tank 500 as the first and second energy storage windings 104, 204.

Further, the fourth ferroresonant transformer 400 has a primary side 410 including a first input winding 402 with a first leakage inductance 414. The primary side 410 receives an AC power 12, $I_{AC}$, from the same AC current source as the first, second, and third ferroresonant transformers 100, 200, 300. The secondary side 412 of the fourth ferroresonant transformer 400 includes a fourth output winding 406 and a fourth energy storage winding 404. The fourth energy storage winding 404 is electrically coupled to the same capacitors 14a, 14b, 14c, 14d of the energy tank 500 as the first, second, and third energy storage windings 104, 204, 304.

In FIG. 4, the LEDs 150, 250, 350, 450 are shown as coupled to the output windings 106, 206, 306, 406 via dashed lines. These dashed lines indicate that any practical circuitry may be used to process the output power signal before they are received by the LEDs 150, 250, 350, 450. For instance, the circuitry can include a rectifier 14 and/or a smoothing capacitor 18 as shown in FIG. 3. Further, the four ferroresonant transformers 100, 200, 300, 400 may be connected in series, parallel, or any combination thereof.

Figure 5:
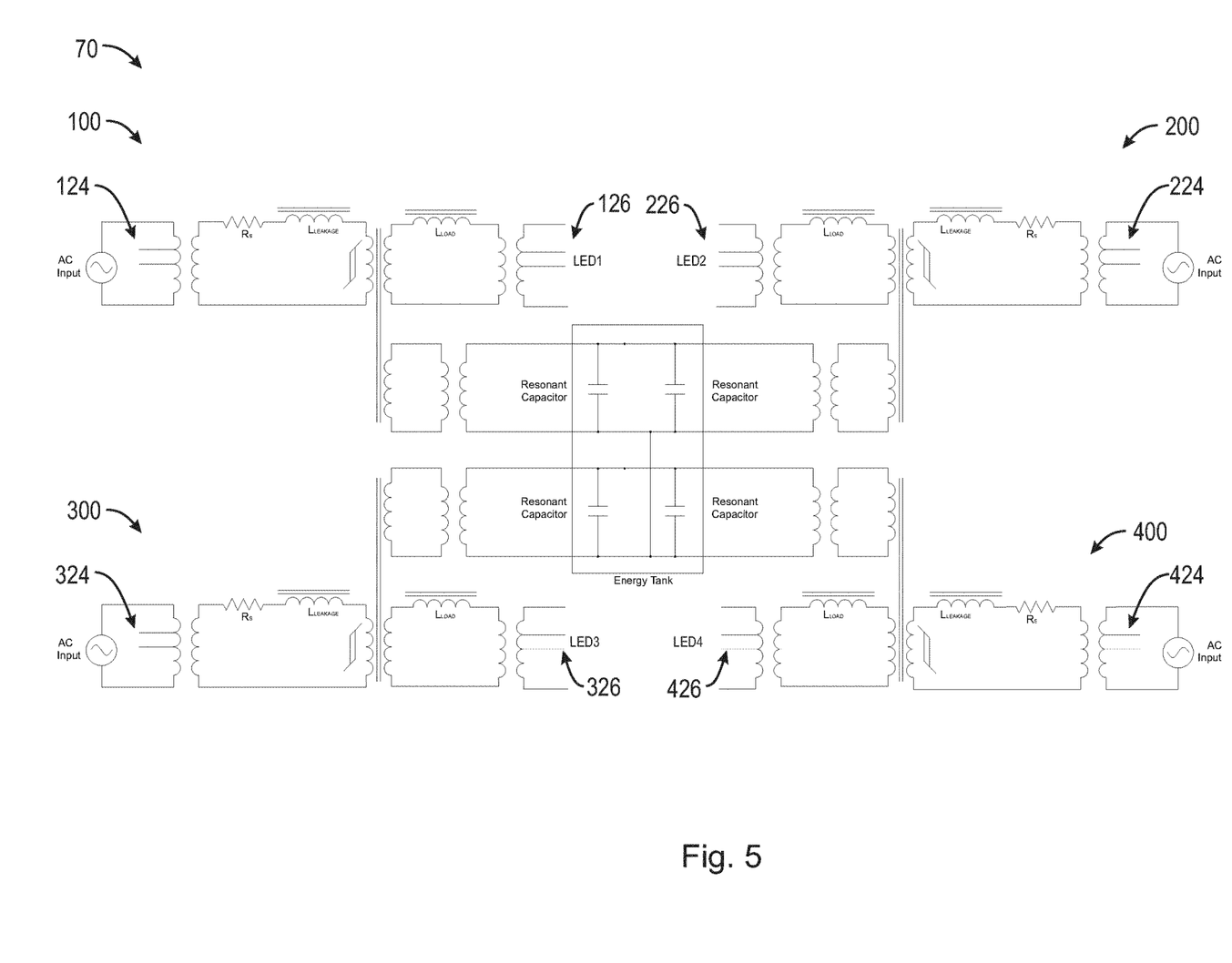
FIG. 5 is a schematic of a lighting device including four modular ferroresonant transformers, in accordance with a further example.

FIG. 5 shows a lighting device 70. Lighting device 70 is a variation of the lighting device 40 of FIG. 4. In this variation, four ferroresonant transformers 100, 200, 300, 400 are used. Each ferroresonant transformer includes a plurality of input taps 124, 224, 324, 424 and output taps 126, 226, 326, 426. Adding input taps 124, 224, 324, 424 and output taps 126, 226, 326, 426 increases the flexibility of matching different LED loads to each ferroresonant output.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A lighting device having a light emitting diode, comprising:
   a first ferroresonant transformer for driving the LED, comprising:
      a first input winding configured to receive alternating current, AC, power;
      a first energy storage winding electrically coupled to one or more capacitors; and
      a first output winding configured to provide a first output power signal based on the one or more capacitors and the AC power;
      wherein the first input winding is arranged on a primary side of the first ferroresonant transformer, and wherein the first energy storage winding and the first output winding are arranged on a secondary side of the first ferroresonant transformer; and a second ferroresonant transformer, comprising:
  a second input winding configured to receive the AC power;
  a second energy storage winding electrically coupled to the one or more capacitors; and
  a second output winding configured to provide a second output power signal based on the one or more capacitors and the AC power;
  wherein the second input winding is arranged on a primary side of the second ferroresonant transformer, and wherein the second energy storage winding and the second output winding are arranged on a secondary side of the second ferroresonant transformer;
a rectifier circuit electrically coupled to the first output winding, wherein the rectifier circuit is configured to generate a first rectified power signal based on the first output power signal;
a smoothing capacitor electrically coupled to the rectifier circuit, wherein the smoothing capacitor is configured to generate a first smoothed power signal based on the first rectified power signal and a first load inductance to enable power to one or more light emitting diodes; and
wherein the first output winding is electrically coupled to the second output winding.

2. The lighting device of claim 1, wherein at least two of the one or more capacitors are arranged in parallel.

3. The lighting device of claim 1, wherein the AC power has a voltage of at least 300 VAC.

4. The lighting device of claim 1, wherein the first load inductance corresponds to a gap between the first energy storage winding and a first output winding.

5. The lighting device of claim 1, wherein the first ferroresonant transformer and the second ferroresonant transformer are arranged in parallel.

6. The lighting device of claim 1, wherein the first ferroresonant transformer and the second ferroresonant transformer are arranged in series.

7. The lighting device of claim 1, wherein the first LED and the second LED are electrically coupled and arranged in series.

8. The lighting device of claim 1, wherein the first LED and the second LED are electrically coupled and arranged in parallel.

9. The lighting device of claim 1, wherein the first output power signal has a voltage of at least 60 V.

10. The lighting device of claim 1, wherein the first output power signal and the second output power signal are substantially equal.

11. The lighting device of claim 1, further comprising:
  a plurality of input taps electrically coupled to the first input winding; and
  a plurality of output taps electrically coupled to the first output winding.

* * * * *